United States Patent [19]

Ziegler et al.

[11] Patent Number: 4,507,568
[45] Date of Patent: Mar. 26, 1985

[54] DEVICE FOR INITIATING THE REMOTE FEED OF ELECTRICAL USERS

[75] Inventors: Alfred Ziegler; Gerhard Musil, both of Munich, Fed. Rep. of Germany

[73] Assignee: Siemens Aktiengesellschaft, Berlin & Munich, Fed. Rep. of Germany

[21] Appl. No.: 488,443

[22] Filed: Apr. 25, 1983

[30] Foreign Application Priority Data

May 3, 1982 [DE] Fed. Rep. of Germany ....... 3216497

[51] Int. Cl.³ .................................................. H01H 35/00
[52] U.S. Cl. .................................... 307/112; 307/326; 340/652; 324/62
[58] Field of Search ....................... 307/112, 127, 131; 340/652; 324/62

[56] References Cited

U.S. PATENT DOCUMENTS

| 3,628,099 | 12/1971 | Atkins | 324/62 R X |
| 4,066,953 | 1/1978 | Gold | 324/62 X |
| 4,362,952 | 12/1982 | Ziegler | 307/77 |

FOREIGN PATENT DOCUMENTS

| 1154525 | 9/1963 | Fed. Rep. of Germany . |
| 1157663 | 11/1963 | Fed. Rep. of Germany . |
| 2620348 | 6/1977 | Fed. Rep. of Germany . |
| 0139399 | 10/1979 | Japan | 340/652 |
| 1286033 | 8/1972 | United Kingdom . |

Primary Examiner—A. D. Pellinen
Assistant Examiner—Derek Jennings
Attorney, Agent, or Firm—Hill, Van Santen, Steadman & Simpson

[57] ABSTRACT

For remote feed of a group of electrical users connected in series in a closed loop, a dc voltage is applied to the loop in a polarity opposite to a normal feed voltage in order to determine whether interruptions are present, even if a human body is shunting the loop at the interruption. Each of the users has a diode connected in parallel to its inputs which is polarized such that when the test voltage for creating a test current is applied, substantially only a resistance of the loop is measured exclusive of the users. A loop resistance is determined from a measurement of the test current and the loop resistance is compared to a test resistance set lower than a human body resistance. If the loop resistance is lower than the test resistance, then normal remote feed current is applied to the loop since no interruptions exist. If the loop resistance exclusive of the users is of a same magnitude or greater than the human body resistance, then shunt arms are employed in the loop comprised of resistors and diodes to lower the loop resistance during feed of test current so as to reliably detect whether an interrupt location is present.

12 Claims, 1 Drawing Figure

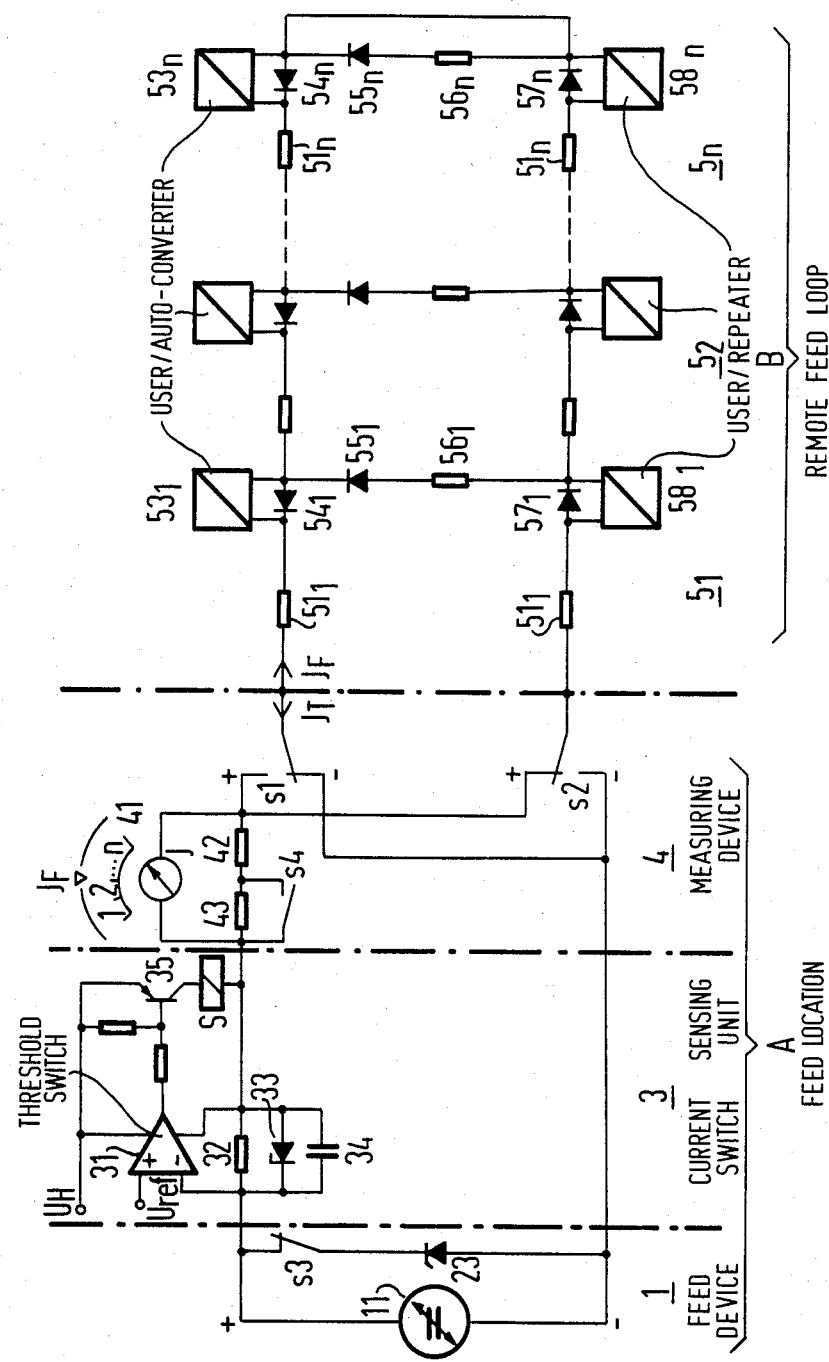

DEVICE FOR INITIATING THE REMOTE FEED OF ELECTRICAL USERS

BACKGROUND OF THE INVENTION

The invention relates to a method for initiating the remote feed of electrical users by means of dc series feed, particularly intermediate stations of devices of communication transmission technology. A feed device containing a dc source is provided in a feed location and a resistance of the remote feed circuit is first checked. The remote feed current is only switched on as soon as a value of the resistance of the remote feed circuit lying below a prescribed amount is determined in the feed location.

It is known, for example, from German Letters Patent AS No. 1,902,090, which corresponds to British Letters Patent No. 1,286,033, incorporated herein by reference, to employ devices in the remote feed of electrical users for automatically closing the remote feed circuit in front of an interruption location, and particularly to employ so-called switch auxiliaries. Such devices close the remote feed circuit via a cross arm as long as no current of a prescribed size is measured in the continuing portion of the remote feed circuit. One section after another of the remote feed path is checked and, under certain conditions, hooked up in this manner when the remote feed is initiated. Thus, one can avoid placing the remote feed in operation when a resistance reaching or even exceeding a prescribed value of resistance corresponding to human body resistance is adjacent to an interrupt location.

Another embodiment of a device for closing a remote feed circuit in front of an interrupt location proceeds from the German Letters Patent AS No. 1,154,525, incorporated herein by reference.

On the other hand, a device for the remote feed of electrical users by means of dc series feed can be constructed without such switch auxiliaries, for example, in view of limited installation space. When initiating such remote feed paths, the remote feed device in the feeding location must hook up the remote feed current to the loop resistance of the complete path. However, for reasons of personal protection, completion of a hookup must be avoided when the remote feed circuit is closed at an interrupt location by means of contact via human body resistance.

As long as the remote feed current is so low that it does not exceed a value allowable upon contact, for example 40 mA, the hookup can be undertaken without additional techniques.

Given high remote feed currents, however, a check is preferably carried out before initiation to determine whether the feed loop circuit is completely closed and is not perhaps bridged by contact at an interrupt location. The difficulty accordingly arises that the loop resistance of a complete remote feed path exhibits far higher values, particularly at low test voltages or currents, than human body resistance which, for example, can be assumed at 2000 Ω. Thus, difficulties can arise since an intact loop when checking the overall remote feed loop cannot be distinguished with sufficient reliability from a remote feed loop where an interrupt location is bridged by human body resistance. It can be particularly disadvantageous that the range of the remote feed and the specific resistance of the remote feed current paths are limited in consideration of the desired check.

SUMMARY OF THE INVENTION

It is an object of the invention to create a method for initiating the remote feed of electrical users which guarantees, in particular, an automatic, harmless initiation of a remote feed path without devices for automatically closing the remote feed loop in front of an interrupt location, and which is independent of the value of resistance associated with the users.

According to the method of the invention, given one-side feed of the remote feed loop constructed free of devices for automatically closing the remote feed loop in front of an interrupt location, diodes poled in a blocking direction for the remote feed current are positioned in parallel to the users. A check of the resistance of the remote feed loop is undertaken such that the current thereby flowing is directed opposite relative to the remote feed current. The check of the remote feed loop before initiation is accordingly not undertaken in normal polarization wherein the dc input resistance of the users or intermediate locations is fully effective but, rather, in reverse polarization. Since the diodes or Zener diodes through which test current flows in the forward conducting direction during the test are provided at the input posts of the users, the resistance of the remote feed loop is practically determined only by the relatively low copper resistance of the remote feed line which usually exhibits considerably lower values than does human body resistance given contact by a human body.

The measurement of the loop resistnce can thus be provided with the assistance of an impressed voltage and measurement of the current, or with the assistance of an impressed current and measurement of the voltage. The diodes lying parallel to the users can be formed by one or more diode paths connected in series or by Z-diodes and, under certain conditions, can serve to limit or stabilize the user voltage. In case the users are not sufficiently protected against feed voltages of the wrong polarity by the parallel connection diodes, other diodes can be additionally incorporated in series with the users, these being polarized in the forward direction for the remote feed current. Such an arrangement proceeds for example from German AS No. 1,157,663, incorporated herein by reference.

A circuit arrangement for executing the method is preferably designed such that the feed location contains a changeover for pole-reversed connection of the remote feed circuit to the feed means which is controllable by an arrangement for measuring the loop resistance. The arrangement for measuring the loop resistance and the controllable changeover means can be structurally united with the feed means or with the remote feed device, or can be accommodated in an additional structural unit of the feed location. The feed device can preferably be switched from a constant current source to a constant voltage source.

In a further development of the invention, the method can also be applied to remote feed loops whose resistance during testing already lies in the range of human body resistance in that the feed loop is provided with cross or shunt arms which are only conductive for currents having the direction of the test current. The cross or shunt arms preferably contain a series connection consisting of an ohmic resistor and diode poled in the blocking direction for the remote feed current. In an advantageous manner, the cross or shunt arms can at the same time be a component of a device for error locating.

The operation of intermediate repeaters associated with the remote feed device in a series connection with constant dc, and wherein locating the fault location proceeding from the feeding location is possible in case of a line interruption proceeds, for example, from German AS No. 1,157,663, incorporated herein by reference. A resistor is connected in series with a diode inversely poled for remote feed voltage and is connected in each intermediate location between two remote feed current paths. In the fault condition, the input resistance of the remaining line part is measured in the feed location with a non-injurious voltage of 60 V with a polarization opposite that of the remote feed voltage. The position of the interrupted field can be concluded from the current. Constant current diodes can also be provided in the intermediate locations instead of such precision resistors, as in German AS No. 2,620,348, incorporated herein by reference.

The fault locating can be undertaken with the assistance of a constant current source or a constant voltage source in conjunction with a voltage or current measurement.

Of particular advantage for the inventive method is that the conductance of the precision resistors lying parallel further reduces the input resistance of the remote feed loop in this test on lines on which conductance measurement is applied for fault locating. It is then advantageous to select the value of the precision resistor low to the extent the measuring precision of the fault locating allows it, so that as low as possible a value for the input resistance of the feed loop is achieved. As a result, a sufficient distinction can be achieved between line input resistance and human body resistance, even in cases in which the copper resistance alone already reaches approximately the value of human body resistance.

This check of the line before initiation does not represent an added expense for the remote feed means on lines for which conductance measurement is applied for fault locating since the locating measurement is carried out in nearly the same manner in case of a line interruption, particularly given application of the same test voltage. This fact also allows automation of the check and locating operation with only a slight expense.

In a further development of the invention, the circuit arrangement is designed such that one and the same constant voltage source or constant current source is provided for testing the loop resistance and for fault locating. In a further development of the invention, the feed location contains a relay measuring the current flowing in the remote feed circuit, and changeover contacts of the relay connect the remote feed path to the constant current source with interchanged remote feed current paths in the current-free condition. The relay can also be exploited for switching the sensitivity of an indicator instrument contained in the feed location which measures the current flowing in the remote feed circuit.

BRIEF DESCRIPTION OF THE DRAWING

The drawing FIGURE illustrates a circuit arrangement for automatic, harmless initiation of a remote feed path without switch auxiliaries for automatic fault locating by means of conductance measurement given a line interruption.

DESCRIPTION OF THE PREFERRED EMBODIMENTS

The remote feed loop B serves for the remote feed of intermediate repeaters of a four-wire communication transmission link which is not illustrated in detail in the FIGURE. The remote feed loop is supplied from only one side and therefore exhibits a direct connection of the two leads or remote feed current paths in the end facing away from the feed location.

The feed voltage inputs of the auto-converters $53_1 \ldots 53_n$ or $58_1 \ldots 58_n$ of the repeaters belonging to one transmission direction are looped into each remote feed current path. The auto-converters are supplied over their own remote feed line or over the inner cable conductor in conjunction with remote feed filters. Under certain conditions, the supply voltage inputs of the repeaters themselves or other remotely fed users, for example remote control devices or the like, can be inserted into the remote feed circuit instead of the converters. Under certain conditions, only a single user can be provided per intermediate location. The cable resistances of the feed sections or repeater fields are referenced $51_1 \ldots 51_n$. The users are bridged by diodes $54_1 \ldots 54_n$ or $57_1 \ldots 57_n$. These diodes are poled such that they are blocked for the remote feed current.

Viewed from the feed location A, a cross or shunt arm is situated at the end of each feed section or after each intermediate location containing the users. The cross or shunt arm is comprised of an ohmic resistor $56_1 \ldots 56_n$ and a diode $55_1 \ldots 55_n$ connected in series thereto. The remote feed loop is closed at the end facing away from the feed location A.

The diodes $55_1 \ldots 55_n$ are poled in the blocking direction for the remote feed current. The resistors $56_1 \ldots 56_n$ situated in the cross or shunt arms serve in a manner known per se for fault locating by means of conductance measurement. Even without conductance measurement, such cross or shunt arms can be provided in order to facilitate the testing. Under certain conditions, they can also be eliminated.

The feed location A contains the feed device 1 which exhibits a constant current source 11. A current branch comprised of the break contact S3 of the relay S and of the Z-diode 23 lies parallel to the current source 11. When, given a non-excited relay S, the output voltage of the current source 11 exceeds the Zener voltage of the Z-diode 23, then the output voltage of the feed device 1 is limited to, for example, 60 V.

A current sensing switch unit 3 is provided and has a resistor 32 which lies in the main circuit in series with the current source 11. Threshold switch 31, which comprises the voltage drop at the resistor 32 to the reference voltage $U_{Ref}$ is connected to the resistor 32 serving as a current measurement resistor. When the test current $J_T$ exceeds a prescribed value, then the relay S is excited over the transistor 35.

The threshold switch 31 is protected against surge voltages by a parallel connection of Z-diode 33 and a capacitor 34. The capacitor 34 prevents a response to the threshold switch due to noise pulses given influencing of the link.

The measuring device 4 lies in series with the resistor 32. This consists of the ammeter 41 and a shunt formed by the resistors 42 and 43. One part 42 of the shunt can be shorted with the assistance of the contact s4 of the relay S.

The relay S further exhibits two changeover switches s1, s2, whose respective switching contacts are connected to one of the two remote feed current paths. Given a non-excited relay S, the contact of the changeover S1 is connected to the negative pole of the current source 11 and the contact of the changeover S2 is connected over the measuring device 4 and the resistor 32 to the positive pole of the current source 11. Given an excited relay S, the contact of the changeover S1 is connected over the measuring device 4 and the resistor 32 to the positive pole of the current source 11, and the contact of the changeover S2 is connected to the negative pole of the current source 11.

The testing of the remote feed loop occurs with a voltage exhibiting a harmless value, for example 60 V. Depending on the condition of the remote feed circuit, the following cases result:

1. Test given intact remote feed loop:

Without taking the cross or shunt arms into consideration, the test current $J_T$ amounts to $$J_T = \frac{U_T - 2n \cdot U_D}{n \cdot R_K}$$

where $U_T$ = a harmless test voltage of, for example, 60 V;
n = the number of intermediate locations;
$U_D$ = the threshold voltage of the diodes $54_1 \ldots 54_n$ and $57_1 \ldots 57_n$; and
$R_K$ = the cable resistance $51_1 \ldots 51_n$ of a remote feed section.

Given this current, the normal remote feed operation is initiated by the devices 3 and 4. A correspondingly larger current derives with cross or shunt arms.

2. Testing and fault locating given an interrupted remote feed loop:

In this case:

$$J_T < \frac{U_T - 2nU_D}{nR_K}$$

The locating ensues by means of current measurement, whereby the current is approximately proportional to $$n \cdot \frac{U_T}{R_Q}$$

Accordingly, $R_Q$ denotes the resistance value of a cross or shunt arm formed by the resistors $56_1 \ldots 56_n$ and the diodes $55_1 \ldots 55_n$.

3. Remote feed loop interrupted after m intermediate locations with bridging by a human body resistance $R_B$, whereby m < n, likewise without taking the cross or shunt arms into consideration:

$$J_T = \frac{U_T - 2mU_D}{mR_K + R_B}$$

The test current J flowing in this case given unaltered test voltage $U_T$ is generally lower than when testing the intact remote feed loop B.

4. Given a high loop resistance, i.e. high n $R_K$, it is possible that, in case of an interruption in the front-most part of the line, i.e. for the case m << n, and bridging by a human body resistance $R_B$, the test current $J_T$ is not smaller than the current given testing of the intact remote feed loop B, i.e. m $R_K + R_B <$ n $R_K$, when $U_D$ is left out of consideration. By means of inserting shunt resistors $R_Q$, it can also be achieved in such instances that the test current $J_T$ in this case is always smaller than the current given an intact remote feed loop.

A relay S with changeover contacts is provided in the output circuit of the device. This relay connects the path with reversed polarity in the current-free condition and reduces the output voltage of the feed device to a low value in a known manner. Given initiation of the device, the line input current—polarity reversed—is measured with this voltage. When the line is interrupted, then the current indication immediately supplies the fault location. When the line is in order, then the test current exceeds a critical value at which, due to excitation of the relay S, the line is connected with proper polarity and the limitation of the feed voltage to the low test value is cancelled. The feed device functions fully on the line. The sensitivity of the current measuring instrument is correspondingly switched.

In case of a line interruption, the output current falls below a critical value at which the feed voltage is reduced to the low test value over the changeover relay and the line is also applied with reversed polarity to the test voltage. At the same time, the precision resistor for the ammeter is also switched such that the instrument can indicate the faulty field.

The function of the changeover relay S can, under certain conditions, also be replaced by a circuit with semiconductors exercising the same effect.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method for safely initiating remote feed of feed current after checking for an interruption to a normally closed remote loop formed of series-connected electrical users by means of dc series feed and by use of a feed device provided in a feed location and containing a dc source, comprising the steps of:

providing a single-side feed of the remote feed loop formed of series-connected electrical users;

providing the feed loop free of devices for automatically closing the feed loop in front of an interrupt location;

providing diodes polarized in a blocking direction for the remote feed current and connected parallel to the users;

providing a loop resistance of the closed loop without interruptions to be less than human body resistance;

checking a resistance of the remote feed loop by providing a test voltage relatively safe to the human body which induces a test current which flows oppositely relative to the remote feed current; and switching on the remote feed current if a value of said loop resistance identified at the feed location of the remote feed loop as determined by the test current lies below a prescribed test value chosen such that an interruption can be identified even if a human body resistance shunts the loop at the interruption.

2. A circuit arrangement for checking a resistance of a remote feed loop and thereafter safely providing a feed current to the remote feed loop after checking for an interruption, comprising:
- a remote feed loop having a plurality of electrical users series-connected in a loop which is free of devices for automatically closing the feed loop in front of an interruption location;
- diodes polarized in a blocking direction for the remote feed current and connected parallel to the users;
- a loop resistance of the closed loop without interruptions being less than human body resistance;
- a feed device at a feed location containing a dc source; and
- said feed location including means for checking a feed circuit, and changeover contacts of the relay connect the remote feed loop in a current-free condition to the dc source with interchanged remote feed current paths.

10. A circuit arrangement according to claim 9 wherein a display means is provided at the feed location for measuring current flowing in the remote feed circuit, and a sensitivity range of the display means being switchable with assistance of the relay.

11. A circuit arrangement according to claim 5 wherein the shunt arm means are dimensioned such that the resistance of the loop as determined from the test current is always higher than said prescribed test value given an interrupted remote feed loop shunted at any interrupt location by a human body resistance.